United States Patent [19]
Pope
[11] 4,429,750
[45] Feb. 7, 1984

[54] RIDGE LEVELER

[76] Inventor: Jerry O. Pope, Rte. 1, Box 37, Loyal, Okla. 73756

[21] Appl. No.: 269,369
[22] Filed: Jun. 1, 1981
[51] Int. Cl.[3] ........................ A01B 25/00; A01B 35/18
[52] U.S. Cl. .................................... 172/253; 172/157; 172/182; 172/705
[58] Field of Search ............... 172/178, 253, 250, 509, 172/705, 711, 709, 551, 510, 567, 833, 198, 182, 193, 156, 157

[56] References Cited

U.S. PATENT DOCUMENTS

| | | | |
|---|---|---|---|
| 623,677 | 4/1899 | Kouns | 172/567 |
| 2,252,593 | 8/1941 | Bruene | 172/551 X |
| 2,338,374 | 1/1944 | Baldwin | 172/705 |
| 2,722,878 | 11/1955 | Neel | 172/659 |
| 2,963,095 | 12/1960 | Oehler | 172/178 |
| 3,306,368 | 2/1967 | Rosenvold | 172/833 |
| 3,880,242 | 4/1975 | Rogers | 172/253 |
| 4,211,284 | 7/1980 | Collado | 172/567 |
| 4,279,311 | 7/1981 | Dietrich | 172/509 |
| 4,280,563 | 7/1981 | Crow | 172/253 |

OTHER PUBLICATIONS

Noble Family of Mulchers-Advertizing brochure of Noble Mfg. Co., Sac. City, Iowa, 9-72.

*Primary Examiner*—Richard J. Johnson
*Attorney, Agent, or Firm*—Dunlap & Codding

[57] ABSTRACT

A ridge leveler adapted for use with a plow having a forward row of discs and a rearward row of discs comprising: a ridge blade assembly connected to the forward row of discs and positioned generally near the outermost disc of the forward row of discs for substantially leveling the outermost ridge of earth resulting from the outermost disc of the forward row of discs plowingly engaging the earth to reduce the volume of earth plowingly engaged by the outermost disc on the rearward row of discs.

12 Claims, 5 Drawing Figures

RIDGE LEVELER

BACKGROUND OF THE INVENTION

Field of the Invention

This invention generally relates to attachments to plows and, more particularly, but not by way of limitation, to a ridge leveler for substantially leveling the outermost ridge of earth resulting from the outermost disc of a forward row of discs plowingly engaging the earth to substantially reduce the volume of earth to be plowingly engaged by the outermost disc on a rearward row of discs.

DESCRIPTION OF THE PREFERRED EMBODIMENT

Figure 1:
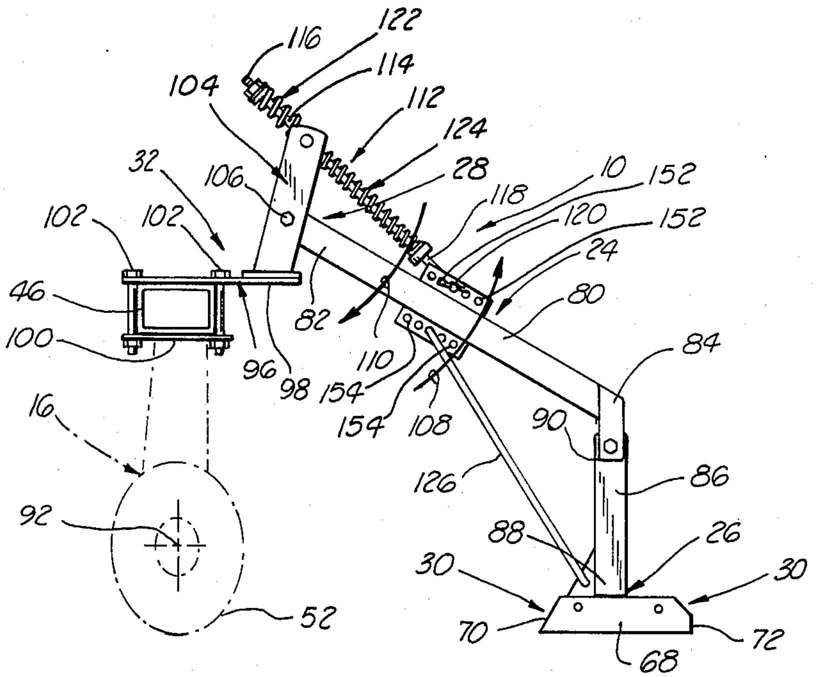
FIG. 1 is a side elevational view of a ridge leveler constructed in accordance with the present invention, showing a portion of a forward row of discs and particularly the outermost disc in dashed lines.

Referring to the drawings in general and to FIGS. 1, 3, 4 and 5 in particular, shown therein and designated by the general reference numeral 10 is a ridge leveler which is constructed in accordance with the present invention. The ridge leveler 10 particularly is adapted to be used with a plow 12 (shown in FIG. 2), which is pullable by a tractor 14 (partially shown in dashed lines in FIG. 2) or the like, having a first forward row of discs 16 (shown in FIG. 2) mounted thereon and a first rearward row of discs 18 (shown in FIG. 2) mounted thereon, the first rearward row of discs 18 being spaced a distance in a rearward direction 20 (shown in FIG. 2) from the first forward row of discs 16 and the first rearward row of discs 18 being positioned to plow substantially the same earth as plowed by the first forward row of discs 16 when the plow 12 is pulled in the forward direction 22 by the tractor 14. In one operational embodiment, the type of plow contemplated to be utilized in conjunction with the present invention is of the type generally referred to in the art as an offset or tandem disc type plow, such plows being commercially available.

In general, the ridge leveler 10 includes: a bar assembly 24, having a first end 26 and a second end 28; a ridge blade assembly 30 which is connected to the first end 26 portion of the bar assembly 24; and a connecting assembly 32 for connecting the second end 28 portion of the bar assembly 24 to the first forward row of discs 16 to support the ridge blade assembly 30 in a plowing position wherein the ridge blade assembly 30 engages a portion of the earth as the plow 12 is being pulled in the forward direction 22. The bar assembly 24 and the ridge blade assembly 30 connected thereto are positioned near the outermost discs of the first forward row of discs 16 to engage and substantially level the outermost ridge of earth resulting from the outermost discs of the first forward row of discs 16 plowingly engaging the earth as the plow 12 is pulled in the forward direction to reduce the volume of earth to be plowingly engaged by the outermost discs on the first rearward row of discs 18.

Figure 2:
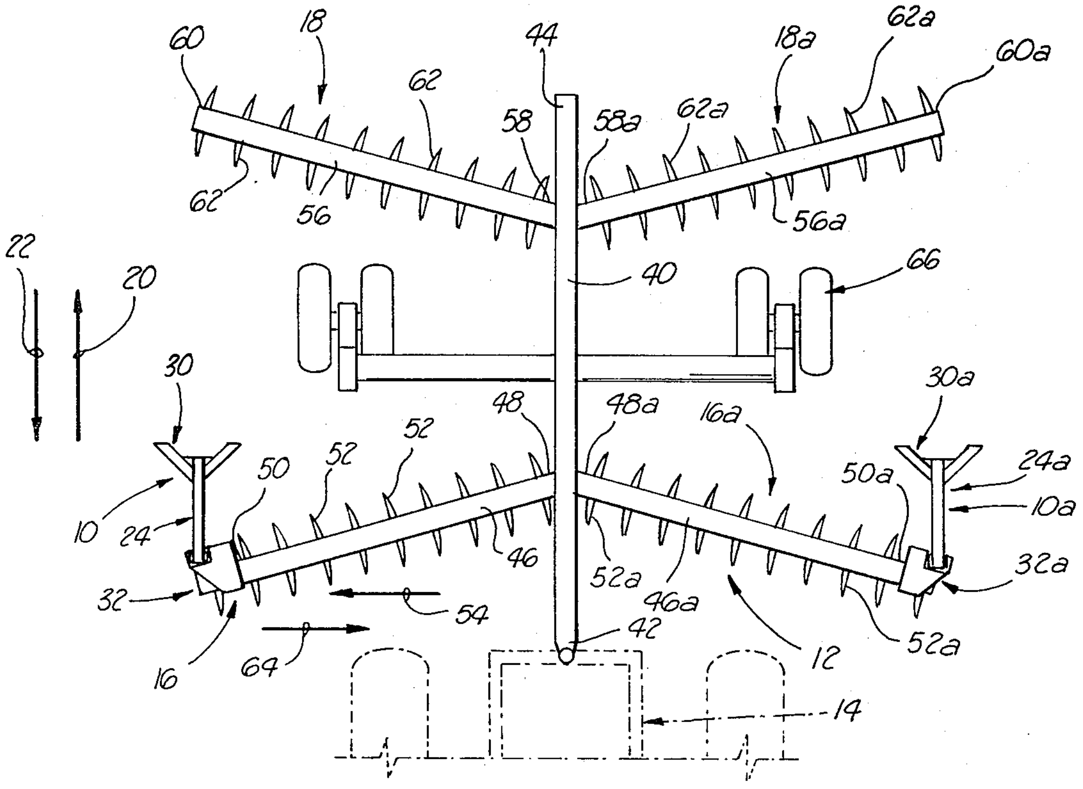
FIG. 2 is a top plan, diagrammatic view showing a plow with a pair of ridge levelers connected thereto which are constructed in accordance with the present invention, a portion of a tractor for pulling the plow being shown in dashed lines.

As shown in FIG. 2, the plow 12 consists of a central beam 40 having a forward end 42 and a rearward end 44. The forward end 42 of the central beam 40 is adapted to be removably connected to the tractor 14, the central beam 40 extending in the rearward direction 20 from the tractor 14.

The first forward row of discs 16 includes a support 46 having opposite ends 48 and 50. A plurality of spaced apart discs 52 are journally supported from the support 46, only some of the discs 52 being designated by a reference numeral in FIG. 2. The discs 52 are positioned and supported on the support 46 to plowingly engage the earth as the plow 12 is being pulled in the forward direction 22, and each disc 52 is positioned to form a ridge of earth near each of the discs 52 and disposed a distance in a general direction 54 from each of the discs 52.

The first rearward row of discs 18 includes a support 56 having opposite ends 58 and 60. A plurality of spaced apart discs 62 are journally supported from the support 56, only some of the discs 62 being designated by a reference numeral in FIG. 2. The discs 62 are positioned and supported on the support 56 to plowingly engage the earth as the plow 12 is being pulled in the forward direction 22, and each disc 62 is positioned to form a ridge of earth near each of the disc 62 and disposed a distance in a general direction 64 from each of the discs 62.

It should be noted that, in one particular plow, the support structure actually consists of a tongue assembly which is connected to a relatively large square frame assembly and the discs are supported generally from the frame assembly. The central beam 40 and the supports 46 and 56 have been shown in FIG. 2 merely as pictorial representations of a support structure and it is understood that various plows will have different support structures in practice.

The first rearward row of discs 18 is spaced a distance in the rearward direction 20 from the first row of forward discs 16, and the first rearward row of discs 18 plows substantially the same earth as the first forward row of discs 16 as the plow 12 is being pulled in the forward direction 22. Each disc 52 in the first rearward row of discs 18 is offset a distance and turned in a different direction with respect to the corresponding discs 52 in the first forward row of discs 16 so that each disc 62 plows a portion of the earth slightly offset with respect to the corresponding discs 52 and so that each disc 62 forms a ridge of earth in a direction from each disc 62 generally opposite with respect to the ridge of earth formed by the discs 52.

The ridge of earth formed by the outermost discs 52 (the discs 52 which is disposed nearest the end 50 of the support 44) is plowingly engaged by the outermost discs 62 (the discs 62 which is nearest the end 60 of the support 56), as the plow 12 is being pulled in the forward direction 22. Thus, the outermost discs 62 of the first rearward row of discs 18 encounters more earth depthwise than the outermost discs 52 of the first forward row of discs 16. The ridge leveler 10 of the present invention is connected to the end 50 portion of the support 46 and positioned so that the ridge blade assembly 30 plowingly engages and substantially levels the ridge of earth formed by the outermost discs 52 of the first forward row of discs 16 to substantially reduce the earth resistance encountered by the outermost discs 62 of the first rearward row of discs 18 as the plow 12 is being pulled in the forward direction 22.

In the embodiment of the invention shown in FIG. 2, the plow 12 also includes a second forward row of discs (designated in FIG. 2 by the reference numeral 16*a*) which is constructed and operates exactly like the first forward row of discs 16 described before, the components or elements of the second forward row of discs 16*a* being designated in FIG. 2 by the same reference numerals as the corresponding components or elements on the first forward row of discs 16, but also followed by the additional designation "a". The plow 12 also includes a second rearward row of discs (designated in FIG. 2 by the reference numeral 18*a*) which is constructed and operates exactly like the first rearward row of discs 18 described before, the components or elements of the second rearward row of discs 18*a* being designated in FIG. 2 by the same reference numerals as the corresponding components or elements on the first rearward row of discs 18, but also followed by the additional designation "a". The first forward and rearward row of discs 16 and 18 are disposed on one side of the central beam 40 and the second forward and rearward row of discs 16*a* and 18*a* each are disposed on the opposite side of the central beam 40.

The discs 52*a* are positioned to form a ridge of earth near each of the discs 52*a* and disposed a distance in a general direction 64 from the discs 52*a*. The discs 62*a* are positioned to form a ridge of earth near each of the discs 62*a* and disposed a distance in a general direction 54 from the discs 62*a*.

A second ridge leveler 10*a* is connected to the end 50*a* portion of the support 46*a* of the second forward row of discs 16*a*. The second ridge leveler 10*a* is constructed and operates exactly like the ridge leveler 10 to plowingly engage and substantially level the ridge of earth formed by the outermost discs 52*a* of the second forward row of discs 16*a*, and thus only the ridge leveler 10 will be specifically referenced to below with respect to the details of construction of the ridge leveler of the present invention, although it will be understood that much description applies equally to the ridge leveler 10*a*.

The plow 12 is rollingly supported on a wheel assembly 66 which is connected to the central beam 40, as shown in FIG. 2.

Plows having forward and rearward rows of discs such as described before with respect to the plow 12, shown in FIG. 2, without the ridge levelers 10 and 10*a* of the present invention, are well-known in the art and commercially available. Thus, a detailed description of the construction and operation of such plows is not deemed necessary.

The ridge blade assembly 30 (shown in greater detail in FIGS. 1, 3, 4 and 5) includes a first ridge blade 68, having an end 70 and an opposite end 72, and a second ridge blade 74, having an end 76 and an opposite end 78. One end 70 portion of the first ridge blade 68 is connected to the first end 26 portion of the bar assembly 24 and the first ridge blade 68 extends in one direction a distance from the first end 26 portion of the bar assembly 24 terminating with the opposite end 72. One end 76 portion of the second ridge blade 74 is connected to the first end 26 portion of the bar assembly 24 and the second ridge blade 74 extends in one direction, generally opposite the direction which the first ridge blade 68 extends from the bar assembly 24, a distance from the first end 26 portion of the bar assembly 24 terminating with the opposite end 78. The first and the second ridge blades 68 and 74 each extend angularly from the bar assembly 24 and are positioned with respect to each other to substantially form a V-shape, as shown more clearly in FIGS. 2 and 3, the first and the second ridge blades 68 and 74 each extending in the rearward direction 20 when the ridge leveler 10 is connected to the first forward row of discs 16 of the plow 12, as shown in FIG. 2. It should be noted that the first and second ridge blades 68 and 74 could be integrally constructed.

The bar assembly 24 includes a first bar 80, having a first end 82 and a second end 84, and a second bar 86, having a first end 88 and a second end 90. The second end 84 portion of the first bar 80 is connected to the second end 90 portion of the second bar 86. The connecting assembly 32 connects the first end 82 portion of the first bar 80 to the end 50 portion of the support 46 of the first forward row of discs 16.

The first bar 80 extends a distance angularly from the first forward row of discs 16 generally downwardly and in the rearward direction 20, as shown in FIG. 2. The second bar 86 extends a distance downwardly and generally toward the earth from the first bar 80. The first and the second bars 80 and 86 being connected and positioned to support the ridge blade assembly 30 in a position spaced a distance generally in the rearward direction 20 from the outermost discs 52 of the first forward row of blades discs 16. As shown more clearly in FIG. 1, the bar assembly 24 and the connecting assembly 32, more particularly, are constructed and positioned to support the ridge blade assembly 30 in a position wherein the first and the second ridge blades 68 and 74 are supported in a horizontal plane which is disposed slightly below a centerline axis 92 of the outermost disc 62 of the first forward row of discs 16, just above the horizontal plane of the lowermost outer peripheral edge of the disc 52.

The connecting assembly 32 includes an upper plate 96 which is disposed on the upper surface of the support 46, as shown in FIG. 1, a portion 98 of the upper plate 96 extending a distance generally in the rearward direction 20 from the support 46. A lower plate 100 is disposed on the lower surface of the support 46, and the upper plate 96 is connected to the lower plate 100 by a plurality of connecting bolts 102 to securedly connect the upper and the lower plates 96 and 100 to the support 46. It should be noted that the upper plate 96 could be bolted directly to the support 46 thereby eliminating the need for the lower plate 100.

The connecting assembly 32 also includes a support arm 104. One end of the support arm 104 is connected to the portion 98 of the upper plate 96 and the support arm 104 extends a distance generally upwardly and generally in the rearward direction from the first forward row of discs 16 and the upper plate 96. The first end 82 portion of the first bar 80, more particularly, is pivotally connected to a portion of the support arm 104 by a pivot connection 106 so that the bar assembly 24 can be pivoted in an upward direction 108 and in a downward direction 110 generally about the pivot connection 106.

The connecting assembly 32 also includes a spring assembly 112 having one end portion pivotally connected to the bar assembly 24. The spring assembly 112 is constructed and positioned to bias the bar assembly 32 in a generally downwardly direction 110 toward the earth to maintain the plowing engagement between the ridge blade assembly 30 and the earth as the plow 12 is being pulled in the forward direction 22. The spring assembly 112 also is constructed and positioned to function in the nature of a shock absorber when the ridge blade assembly 30 is not engaging the ground and the plow 12 is being transported from one location to another.

The spring assembly 112 includes a rod 114 having a first end 116 and a second end 118. The second end 118 portion of the rod 114 is pivotally connected to the first bar 80 at the pivot connection 120, generally midway between the first and the second ends 82 and 84 of the first bar 80. The rod 114 slidingly extends through a portion of the support arm 104, thereby slidingly connecting the rod 114 to the support arm 104.

A first spring 122 is disposed about a portion of the rod 114 and extends generally between the first end 116 portion of the rod 114 and the support arm 104. One end portion of the first spring 122 engages a portion of the rod 114 generally near the first end 116 of the rod 114 and the opposite end portion of the first spring 112 engages a portion of the support arm 104. The first spring 122 acts somewhat in the nature of a shock absorber when the ridge blade assembly 30 is out of the ground and the plow 12 is being transported from one location to another.

A second spring 124 is disposed about a portion of the rod 114 and extends generally between the second end 118 portion of the rod 114 and the support arm 104. One end portion of the second spring 124 engages a portion of the rod 114 generally near the second end 118 of the rod 114 and the opposite end portion of the second spring 124 engages a portion of the support arm 104. The second spring 124 biases the first bar 80 in the downwardly direction 110 generally toward the earth. The second spring 124 also acts in the nature of a shock absorber permitting the bar assembly 24 and the ridge blade assembly 30 connected thereto to be moved a distance in the upwardly direction 108 generally away from the earth to reduce the possibility of structural failure in some of the components of the ridge leveler 10 in the event the ridge blade assembly 30 engages an obstruction during the operation of the plow 12.

A structural support rod 126 is connected between the first bar 80 and the ridge blade assembly 30.

Figure 3:
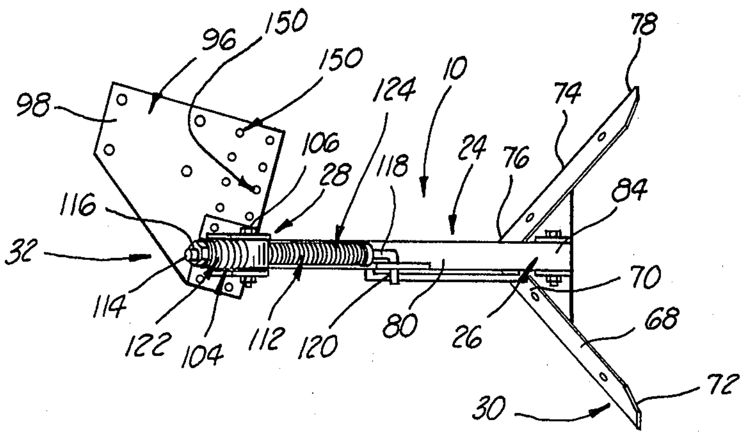
FIG. 3 is a top plan view of the ridge leveler of FIG. 1.
Figure 4:
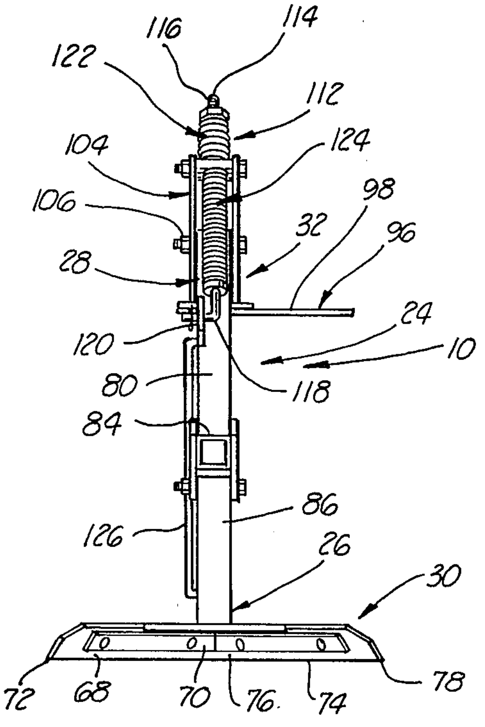
FIG. 4 is a front elevational view of the ridge leveler of FIG. 1.
Figure 5:
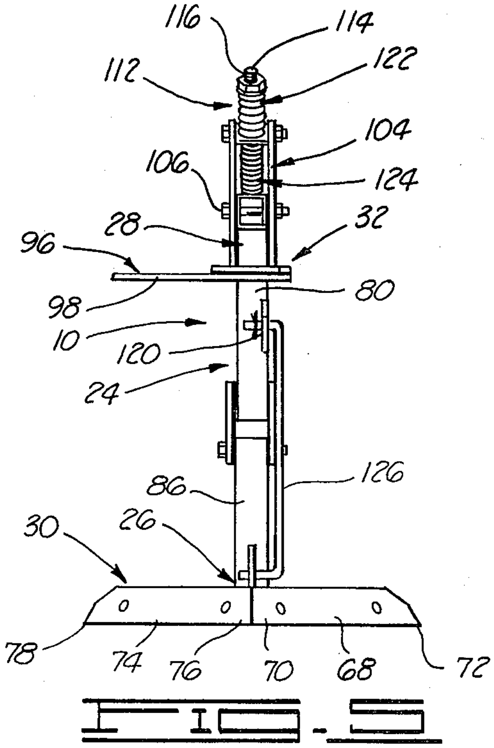
FIG. 5 is a rear elevational view of the ridge leveler of FIG. 1.

As shown in FIG. 3, there are a plurality of holes 150 through the upper plate 96. As the plow 12 travels faster the ridges formed by the discs 52, 62, **52*a* and 62*a* are thrown or formed a greater distance from the respective discs. The holes 150 permit the ridge levelers 10 and 10*a* to be mounted on the supports 46 and 46*a* at various positions so the position of the ridge levelers 10 and 10*a* can be adjusted to plowingly engage the ridges of earth in various operational applications. Only some of the holes 150 have been designated by reference numerals in FIG. 3**.

As shown in FIG. 1, the bar 80 has a flange with a plurality of holes 152 so the pivot connection between the spring assembly 112 and the bar 80 can be adjusted to adjust the height of the ridge levelers 10 and **10*a* or, in other words, to adjust the height of the ridge blades 68 and 74. The bar 80 also has a flange with a plurality of holes 154 so the connection between the support rod 126 and the bar 80 can be adjusted to adjust the pitch or tilt with the horizon of the ridge blades 68 and 74. Only some of the holes 152 and 154 have been designated by reference numerals in FIG. 1**.

Changes may be made in the various components, elements and assemblies of the ridge leveler of the present invention as described herein without departing from the spirit and scope of the invention as defined in the following claims.

What is claimed is:

1. A ridge leveler system comprising:
a plow comprising:
a first forward row of discs mounted on the plow; and
a first rearward row of discs mounted on the plow and spaced a distance from the first forward row of discs, the first rearward row of discs being positioned to plow substantially the same earth as plowed by the first forward row of discs when the plow is pulled in the forward direction;
a ridge leveler, comprising:
a bar assembly having a first end and a second end;
a ridge blade assembly connected to the first end portion of the bar assembly having a substantially flat ground engaging surface and a face having a sufficient area to engage the earth and to substantially level the engaged earth as the plow is being pulled in the forward direction; and
means for connecting the second end portion of the bar assembly to the first forward row of discs to support the ridge blade assembly in a plowing position wherein the ridge blade assembly engages a portion of the earth as the plow is being pulled in the forward direction, the bar assembly and the ridge blade assembly connected thereto being positioned near the outermost discs of the first forward row of discs to engage and substantially level the outermost ridge of earth resulting from the outermost discs of the first forward row of discs plowingly engaging the earth as the plow is being pulled in the forward direction to reduce the volume of earth to be plowingly engaged by the outermost discs on the first rearward row of discs.

2. The ridge leveler system of claim 1 wherein the ridge blade assembly is defined further to include:
a first ridge blade, having opposite ends, one end portion of the first ridge blade being connected to the first end portion of the bar assembly and the first ridge blade extending in one direction a distance from the first end portion of the bar assembly terminating with the opposite end of the first ridge blade, the first ridge blade having a substantially flat ground engaging surface; and
a second ridge blade, having opposite ends, one end portion of the second ridge blade being connected to the first end portion of the bar assembly and the first ridge blade extending generally in one direction a distance from the first end portion of the bar assembly terminating with the opposite end of the second ridge blade, the second ridge blade having a substantially flat ground engaging surface.

3. The ridge leveler system of claim 2 wherein the first ridge blade extends angularly from the bar assembly and wherein the second ridge blade extends angularly from the bar assembly, the first and the second ridge blades substantially forming a V-shape.

4. The ridge leveler system of claim 1 wherein the means for connecting the bar assembly to the first forward row of discs is defined further as pivotally connecting the second end portion of the bar assembly to the first forward row of discs, and wherein the means for connecting the bar assembly to the first forward row of discs is defined further to include:

a spring assembly having one end portion pivotally connected to the bar assembly, the spring assembly biasing the bar assembly generally toward the earth to maintain the plowing engagement between the ridge blade assembly and the earth as the plow is being pulled in the forward direction, the spring assembly functioning in the nature of a shock absorber during the transport of the plow when the ridge blade assembly is disengaged from the earth.

5. The ridge leveler system of claim 1 wherein the bar assembly is defined further to include:

a first bar having a first end and a second end, the means for connecting the bar assembly to the first forward row of discs connecting the first end portion of the first bar to the first forward row of discs, the first bar extending a distance angularly in the rearward direction from the forward row of discs; and a second bar, having a first end and a second end, the second end portion of the second bar being connected to the second end portion of the first bar and the second bar extending a distance from the first bar generally toward the earth, the ridge blade assembly being connected to the first end portion of the second bar, thereby spacing the ridge blade assembly a distance in the rearward direction from the first forward row of discs.

6. The ridge leveler system of claim 5 defined further to include:

a support rod having one end connected to the ridge blade assembly and the opposite end adjustingly connected to the first bar for adjusting the pitch of the ridge blade assembly.

7. The ridge leveler of claim 1 wherein the rod is further defined as being adjustingly connectable to the first bar for adjusting the height of the ridge blade assembly.

8. The ridge leveler system of claim 1 wherein the plow is defined further to include: a second forward row of discs mounted on the plow; and a second rearward row of discs mounted on the plow, the second rearward row of discs being spaced a distance from the second forward row of discs and the second rearward row of discs being positioned to plow substantially the same earth as plowed by the second forward row of discs when the plow is pulled in the forward direction; and wherein the ridge leveler system is defined further to include:

a second ridge leveler, comprising:

a bar assembly having a first end and a second end;

a ridge blade assembly connected to the first end portion of the bar assembly, having a substantially flat ground engaging surface, the ridge blade assembly being adapted to substantially level the engaged earth as the plow is being pulled in the forward direction; and means for connecting the second end portion of the bar assembly to the second forward row of discs to support the ridge blade assembly of the second ridge leveler in a plowing position wherein the ridge blade assembly engages a portion of the earth as the plow is being pulled in the forward direction, the bar assembly and the ridge blade assembly connected thereto being positioned near the outermost discs of the second forward row of discs to engage and substantially level the outermost ridge of earth resulting from the outermost discs plowingly engaging the earth as the plow is being pulled in the forward direction to reduce the volume of earth to be plowingly engaged by the outermost discs on the second rearward row of discs.

9. The ridge leveler system of claim 1 wherein the ridge blade assembly is disposed in a horizontal plane slightly below the centerline axis of the discs of the first forward row of discs during the operation of the ridge leveler wherein the ridge blade assembly is plowingly engaging the earth.

10. The ridge leveler system of claim 2 wherein the first and the second ridge blades each extend in a rearward direction from the bar assembly.

11. The ridge leveler system of claim 1 wherein the means for connecting the bar assembly to the first forward row of discs is defined further as being positioned to support the ridge blade assembly in a horizontal plane slightly below the centerline axis of the outermost discs of the first forward row of discs.

12. A ridge leveler adapted for use with a plow, which is pullable by a tractor or the like, having a first forward row of discs mounted thereon and a first rearward row of discs mounted thereon, the first rearward row of discs being spaced a distance from the first forward row of discs and the first rearward row of discs being positioned to plow substantially the same earth as plowed by the first forward row of discs when the plow is pulled in the forward direction, the ridge leveler comprising:

a bar assembly having a first end and a second end;

a ridge blade assembly; and means for pivotally connecting the second end portion of the bar assembly to the first forward row of discs to support the ridge blade assembly in a plowing position wherein the ridge blade assembly engages a portion of the earth as the plow is being pulled in the forward direction, the bar assembly and the ridge blade assembly connected thereto being positioned near the outermost discs of the first forward row of discs to engage and substantially level the outermost ridge of earth resulting from the outermost discs of the first forward row of discs plowingly engaging the earth as the plow is being pulled in the forward direction to reduce the volume of earth to be plowingly engaged by the outermost discs on the first rearward row of discs, comprising:

a support arm connected to the first forward row of discs and extending a distance therefrom;

a rod, having a first end and a second end, extending through a portion of the support arm, the second end portion of the rod being connected to the first bar;

a first spring disposed about a portion of the rod generally near the first end of the rod, a portion of the first spring engaging a portion of the rod generally near the first end of the rod and another portion of the first spring engaging a portion of the support arm, the first spring functioning in the nature of a shock absorber during the transport of the plow when the ridge blade assembly is disengaged from the earth; and a second spring disposed about a portion of the rod generally near the second end of the rod, a portion of the second spring engaging a portion of the rod generally near the second end of the rod and another portion of the second spring engaging a portion of the support arm, the second spring biasing the first bar in a direction generally toward the earth, the first and the second springs being sized and cooperating so that during the operation of the ridge leveler the second spring biases the bar assembly and the ridge blade assembly in a direction generally toward the earth to permit the ridge blade assembly to plowingly engage the earth, the second spring also permitting the bar assembly and the ridge blade assembly connected thereto to be moved a distance in a direction generally away from the earth to reduce the possibility of failure in the event the ridge blade assembly engages an obstruction.

* * * * *